April 21, 1925.
J. W. TAYLOR
HARROW CART
Filed Feb. 2, 1923
1,535,058
3 Sheets-Sheet 2
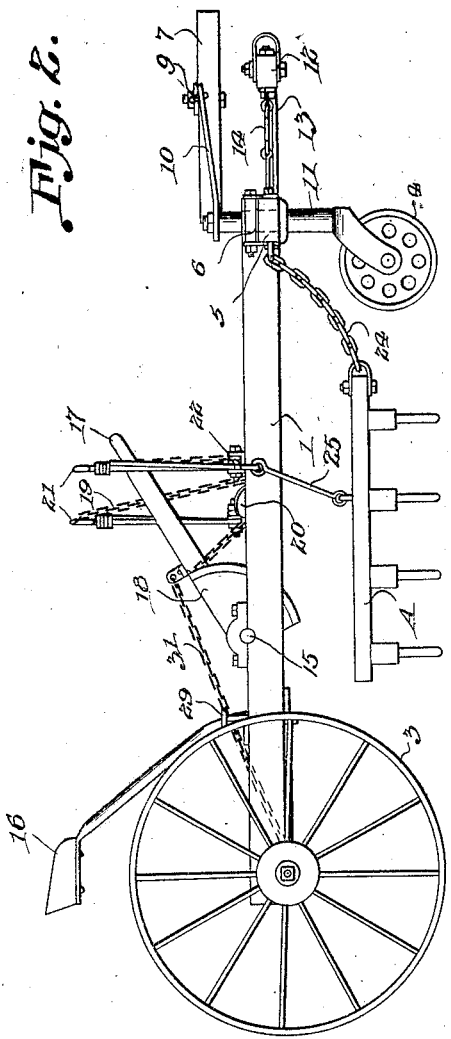
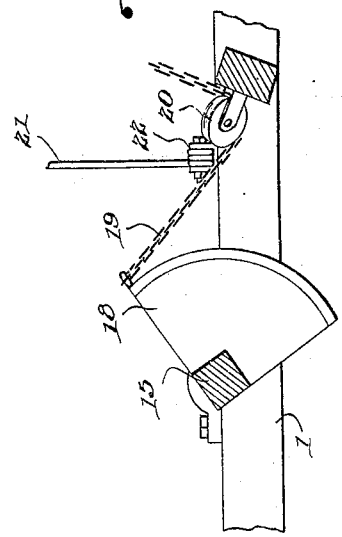
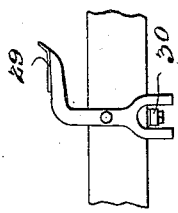
J. W. Taylor
INVENTOR
BY Victor J. Evans
ATTORNEY
WITNESS:

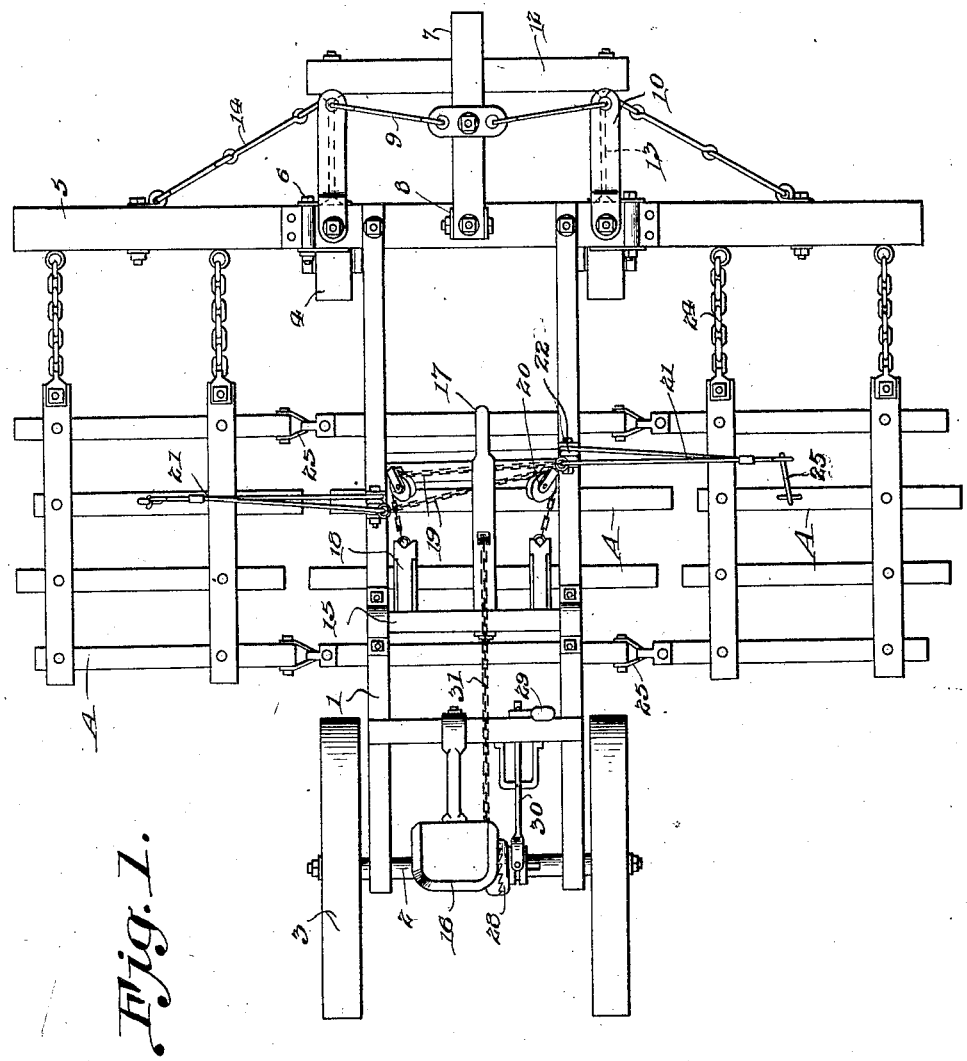

April 21, 1925.

J. W. TAYLOR

HARROW CART

Filed Feb. 2, 1923

J. W. Taylor
INVENTOR

BY Victor J. Evans
ATTORNEY

WITNESS:

Patented Apr. 21, 1925.

1,535,058

UNITED STATES PATENT OFFICE.

JOHN W. TAYLOR, OF BLUE RAPIDS, KANSAS.

HARROW CART.

Application filed February 2, 1923. Serial No. 616,542.

*To all whom it may concern:*

Be it known that I, JOHN W. TAYLOR, a citizen of the United States, residing at Blue Rapids, in the county of Marshall and State of Kansas, have invented new and useful Improvements in Harrow Carts, of which the following is a specification.

This invention relates to a harrow cart, the general object of the invention being to provide a cart to which the harrow is attached, with means on the cart for raising the harrow off the ground and for holding it in folded position so that the harrow can be easily transported along roads or from one field to another without the teeth engaging the ground and also in a folded position so that it can pass through gates and over narrow roads.

Another object of the invention is to provide a single lever for raising and lowering the harrow and folding it when in raised position.

This invention also consists in certain other features of construction and in the combination and arrangement of the several parts to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the invention with the harrow attached.

Figure 2 is a side view thereof.

Figure 4 is an enlarged sectional detail view taken adjacent the center of Figure 1.

Figures 5 and 6 are detail views.

Figure 5:
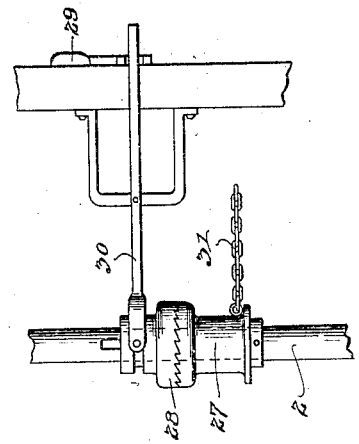
Figure 3:
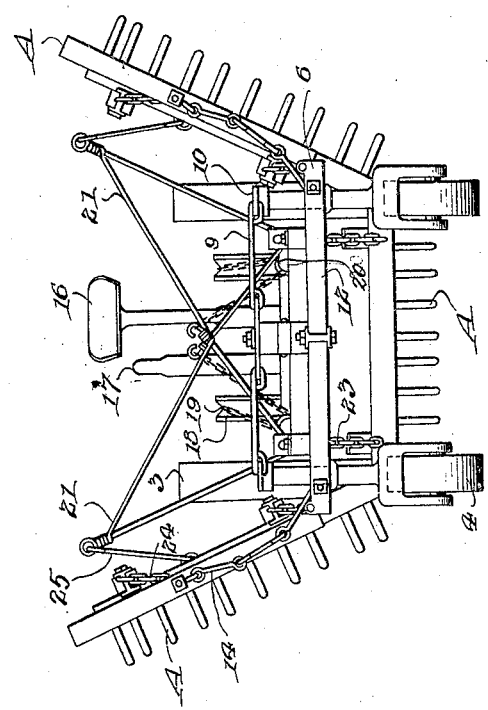
Figure 3 is a front end view with the harrow in folded and raised position.

In these views 1 indicates a frame which carries a rear axle 2 for the rear wheels 3, the front of the frame being supported by the caster wheels 4. Wings 5 are secured to the front cross piece of the frame by means of the hinges 6 so that said wings can be moved upwardly. A tongue 7 is connected with the front part of the frame by the swivel connection 8 and said tongue is also connected by the links 9 with the arms 10 which are connected with the shafts 11 of the caster wheels so that the swinging movement of the tongue will be communicated to said wheels. The double tree 12 is connected by the bars 13 with the front part of the frame and with the wings 5 by means of the flexible connections or links 14, these connections permitting the wings to be swung upwardly without interfering with the double tree. A rock shaft 15 is mounted transversely in the frame adjacent the seat 16 and a lever 17 is connected with said shaft for permitting manual rocking of the same. This shaft carries a pair of sectors 18 having grooves in the curved edges for receiving portions of the chains 19 which have their ends connected with the said sectors. These chains pass through the pulleys 20 carried by the frame and are connected with the inner ends of the triangular shaped arms 21 which are pivoted to the frame by the brackets 22. The harrow is shown at A, the middle section of the harrow being connected by the chains 23 with the front cross piece of the frame and the outer sections being connected by the chains 24 with the wings 5. The outer sections are also connected with the middle section by means of the links 25.

From the foregoing it will be seen that when the lever is moved towards the operator the chains will be caused to engage the curved edges of the sectors and thus the arms 21 will be moved upwardly and inwardly so as to raise the outer sections of the harrow, swinging the same inwardly, the wings 5 also moving upwardly and inwardly, and this movement of the outer sections of the harrow will raise the middle section so that all the sections of the harrow are lifted off the ground and the outer sections are swung to a vertical position with the wings so that the device can pass through narrow gates and along narrow roads. As all the sections of the harrow are in raised position the device can be driven over fences which have been knocked down and over roads and fields without the teeth engaging the ground.

I also provide means for raising the harrows by power furnished from one of the wheels. Such means consists of a drum 27 loosely arranged on the axle 2 and which is adapted to be connected with the axle by the clutch means 28 which are actuated by the foot pedal 29 and the fork 30. Thus the drum can be connected to and disconnected from the axle when desired. A flexible member 31 is connected with the drum and is adapted to be wound thereupon, said member being connected with the lever 17 so that when the drum is rotated to wind the flexible member thereupon the lever will be actuated and thus raise the harrow sections. As soon as the harrow sections are in raised position the pedal is released so as to free the clutch parts and thus prevent further movement of the lever by the drum.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A harrow cart comprising a wheeled frame, wings hinged to the frame, one at each side thereof, a flexible brace for connecting each wing to a part of the frame, a sectional harrow, chains for connecting the middle section with a part of the frame and the outer sections with the wings, triangular shaped arms pivotally connected with the frame, a link connecting the outer end of each arm with an outer section of the harrow, a rock shaft on the frame, sectors thereon, chains connecting the sectors with the upper ends of the arms, guiding pulleys for the chains and means for rocking the shaft to raise and lower the harrow sections.

In testimony whereof I affix my signature.

JOHN W. TAYLOR.